(12) United States Patent
Van Wert et al.

(10) Patent No.: US 11,434,398 B2
(45) Date of Patent: Sep. 6, 2022

(54) ADHESIVE FOR FLEXOGRAPHIC PLATE MOUNTING TAPE

(71) Applicant: 3M INNOVATIVE PROPERTIES COMPANY, St. Paul, MN (US)

(72) Inventors: Scott A. Van Wert, St. Paul, MN (US); Jason D. Clapper, Lino Lakes, MN (US); Naiyong Jing, St. Paul, MN (US); David J. Yarusso, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/733,528

(22) PCT Filed: Feb. 20, 2019

(86) PCT No.: PCT/US2019/018672
§ 371 (c)(1),
(2) Date: Aug. 20, 2020

(87) PCT Pub. No.: WO2019/164868
PCT Pub. Date: Aug. 29, 2019

(65) Prior Publication Data
US 2020/0392382 A1    Dec. 17, 2020

Related U.S. Application Data

(60) Provisional application No. 62/635,210, filed on Feb. 26, 2018, provisional application No. 62/748,758, filed on Oct. 22, 2018.

(51) Int. Cl.
*C09J 133/08*   (2006.01)
*C09J 7/38*     (2018.01)
*C09J 7/50*     (2018.01)

(52) U.S. Cl.
CPC ............. *C09J 133/08* (2013.01); *C09J 7/385* (2018.01); *C09J 7/50* (2018.01); *C09J 2301/414* (2020.08);
(Continued)

(58) Field of Classification Search
None
See application file for complete search history.

(56) References Cited

U.S. PATENT DOCUMENTS 5,156,904 A    10/1992  Rice
5,221,497 A    6/1993   Watanabe
(Continued)

FOREIGN PATENT DOCUMENTS

WO    WO 2014-001096    1/2014

OTHER PUBLICATIONS

International Search report for PCT International Application No. PCT/US2019/018672 dated Jun. 17, 2019, 7 pages.

*Primary Examiner* — Chinessa T. Golden
(74) *Attorney, Agent, or Firm* — Kathleen B. Gross; Steven A. Bern (57) ABSTRACT

Pressure sensitive adhesives are provided comprising an adhesive copolymer which is a copolymer of a set of monomers comprising: a) 41.0-49.0 weight percent of isobornyl acrylate (IBOA); b) 0.0-4.5 weight percent of one or more basic-functional polar monomers comprising a polymerizable double bond; and c) 46.5-58.9 weight percent of one or more alkyl (meth)acrylate monomers, where the alkyl groups are selected from linear and branched alkyl groups comprising 2-12 carbon atoms and branched alkyl groups comprising 13-20 carbon atoms and wherein weight percentages are weight percent of all monofunctional monomers comprising the adhesive copolymer. In another aspect, the present disclosure provides tapes comprising the pres-
(Continued)

sure sensitive adhesive according to the present disclosure. In some embodiments, the tapes are flexographic plate mounting tapes.

20 Claims, 1 Drawing Sheet

(52) U.S. Cl.
CPC ...... *C09J 2400/243* (2013.01); *C09J 2433/00* (2013.01)

(56) References Cited

U.S. PATENT DOCUMENTS

| | | | |
|---|---|---|---|
| 5,597,512 | A | 1/1997 | Watanabe |
| 6,915,741 | B2* | 7/2005 | Price .......................... B32B 5/18 |
| | | | 101/376 |
| 8,152,944 | B2 | 4/2012 | Ellringmann |
| 8,802,226 | B2 | 8/2014 | Eveson |
| 8,962,777 | B2 | 2/2015 | Ellringmann |
| 2002/0142154 | A1* | 10/2002 | Griffith, Jr. ................ C09J 7/50 |
| | | | 428/343 |
| 2006/0057366 | A1 | 3/2006 | Husemann |
| 2006/0145127 | A1 | 7/2006 | Lockridge |
| 2010/0043969 | A1 | 2/2010 | Husemann |
| 2011/0019280 | A1 | 1/2011 | Lockridge |
| 2011/0111157 | A1* | 5/2011 | Onderisin ................ B32B 7/06 |
| | | | 428/41.8 |
| 2011/0166311 | A1 | 7/2011 | Ellringmann |
| 2013/0344276 | A1* | 12/2013 | Seitz .......................... C09J 7/10 |
| | | | 428/41.8 |
| 2015/0361307 | A1 | 12/2015 | Van |
| 2016/0083629 | A1* | 3/2016 | Wang ..................... C09J 133/10 |
| | | | 522/74 |
| 2017/0313915 | A1 | 11/2017 | Putz |
| 2018/0022974 | A1 | 1/2018 | Ellringmann |

\* cited by examiner

ADHESIVE FOR FLEXOGRAPHIC PLATE MOUNTING TAPE

CROSS REFERENCE TO RELATED APPLICATIONS

This application is a national stage filing under 35 U.S.C. 371 of PCT/US2019/018672, filed Feb. 20, 2019, which claims the benefit of U.S. Provisional Patent Application Nos. 62/635,210, filed Feb. 26, 2018, and 62/748,758, filed Oct. 22, 2018, the disclosures of which are incorporated by reference in their entirety herein.

FIELD OF THE DISCLOSURE

This disclosure relates to pressure sensitive adhesives (PSA's), such as may be used in a flexographic plate mounting tape, as well as flexographic plate mounting tapes incorporating this adhesive and methods of making and using such tapes.

BACKGROUND OF THE DISCLOSURE

Flexographic plate mounting tapes are used to mount flexographic printing plates to plate cylinders in a flexographic printing press. The following references may be relevant to the general field of technology of the present disclosure: US 2006/0057366; US 2010/0043969; WO 2014/001096; US 2006/0145127; U.S. Pat. Nos. 5,156,904; 6,915,741; 8,962,777; US 2015/0361307; U.S. Pat. Nos. 8,152,944; 8,802,226; and US 2011/0019280.

SUMMARY OF THE DISCLOSURE

Briefly, the present disclosure provides pressure sensitive adhesives comprising an adhesive copolymer which is a copolymer of a set of monomers comprising: a) 41.0-49.0 weight percent of isobornyl acrylate (IBOA); b) 0.0-4.5 weight percent of one or more basic-functional polar monomers comprising a polymerizable double bond; and c) 46.5-58.9 weight percent of one or more alkyl (meth) acrylate monomers, where the alkyl groups are selected from linear and branched alkyl groups comprising 2-12 carbon atoms and branched alkyl groups comprising 13-20 carbon atoms and wherein weight percentages are weight percent of all monofunctional monomers comprising the adhesive copolymer. In some embodiments, alkyl groups are selected from linear and branched alkyl groups comprising at least 4 carbon atoms and not more than 10 carbon atoms. In some embodiments, the basic-functional polar monomers comprising a polymerizable double bond are selected from nitrogen-containing species; in some, from species which include an amide group; and in some, from species which include a cyclic amide (lactam) moiety. In some embodiments, the set of monomers comprises at least 0.1 weight percent of the basic-functional polar monomers comprising a polymerizable double bond and in some not more than 1.6 weight percent. In some embodiments the set of monomers comprises no acid-functional monomers. In some embodiments, the set of monomers comprises not less than 41.8 weight percent of isobornyl acrylate (IBOA) and in some not less than 42.3 weight percent of isobornyl acrylate (IBOA). In some embodiments the adhesive polymer is crosslinked. Additional embodiments of the pressure sensitive adhesive of the present disclosure are described below under "Selected Embodiments."

In another aspect, the present disclosure provides tapes comprising the pressure sensitive adhesive according to the present disclosure. In some embodiments such tapes comprise a first pressure sensitive adhesive layer comprising the pressure sensitive adhesive according to the present disclosure, borne on a first substrate, wherein the first pressure sensitive adhesive layer is an outermost layer of the tape. In some embodiments the first substrate is a polymeric foam. In some embodiments, the first pressure sensitive adhesive layer is directly bound to a first primer layer which is directly bound to the first substrate. In some such embodiments the first substrate is an ethylene/vinyl acetate copolymer foam and the first primer layer comprises an ethylene/vinyl acetate copolymer. In some embodiments, the tape additionally comprises a second pressure sensitive adhesive layer borne on a second substrate, where the first substrate is bound to the second substrate and where the second pressure sensitive adhesive layer is also an outermost layer of the tape. Additional embodiments of the tapes of the present disclosure are described below under "Selected Embodiments."

In another aspect, the present disclosure provides pressure sensitive adhesive layers, and tapes comprising such pressure sensitive adhesive layers such as flexographic plate mounting tapes, comprising air release channels in the adhesive surface, wherein the depth of the air release channels is not more than 18% of the thickness of the pressure sensitive adhesive layer. In some embodiments, the depth of the air release channels is not more than 17% of the thickness of the pressure sensitive adhesive layer, in some not more than 16%, and in some not more than 15%. In some embodiments, the depth of the air release channels is at least 4 microns, in some at least 5 microns, in some at least 6 microns, and in some at least 7 microns. In some embodiments, the pressure sensitive adhesive layer is as described above. Additional embodiments of pressure sensitive adhesive layers of the present disclosure are described below under "Selected Embodiments."

The preceding summary of the present disclosure is not intended to describe each embodiment of the present invention. The details of one or more embodiments of the invention are also set forth in the description below. Other features, objects, and advantages of the invention will be apparent from the description and from the claims.

In this application:

"directly bound" refers to two materials that are in direct contact with each other and bound together;

"(meth)acrylate" includes, separately and collectively, methacrylate and acrylate; and "pendent" functional groups of a polymer are groups that are not terminal groups, that do not form a part of the polymer backbone, and that are covalently attached to the polymer backbone.

All scientific and technical terms used herein have meanings commonly used in the art unless otherwise specified.

As used in this specification and the appended claims, terms such as "coated" and "embossed" are intended to represent structure, and not to limit the process used to obtain the recited structure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

DETAILED DESCRIPTION

Figure 1:
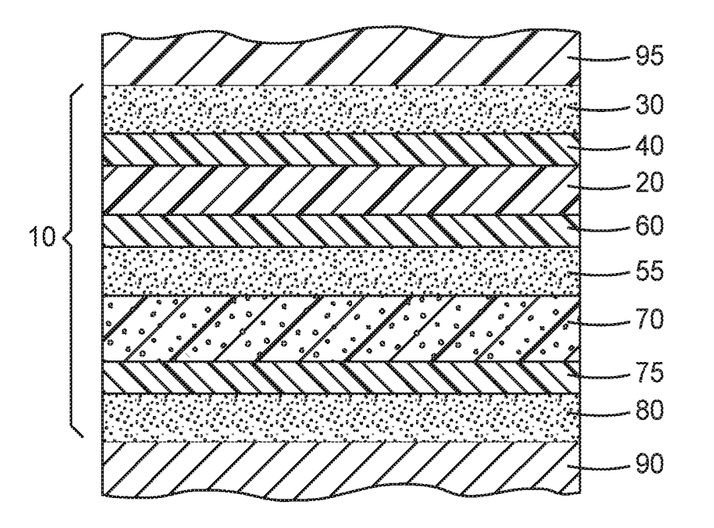
The FIGURE is a cross-section of one embodiment of a flexographic plate mounting tape according to the present disclosure.

The present disclosure provides a pressure sensitive adhesive comprising an adhesive copolymer. The adhesive copolymer is a copolymer of: a) 41.0-49.0 weight percent of isobornyl acrylate (IBOA); b) 0.0-4.5 weight percent and preferably 0.1-4.5 weight percent of one or more basic-functional polar monomers comprising a polymerizable double bond; and c) 46.5-58.9 weight percent of one or more alkyl (meth)acrylate monomers, where the alkyl groups are selected from linear and branched alkyl groups comprising 2-12 carbon atoms and branched alkyl groups comprising 13-20 carbon atoms. In some embodiments, the pressure sensitive adhesive of the present disclosure is lightly crosslinked. The present disclosure also provides tapes comprising a pressure sensitive adhesive layer of the present adhesive. The tapes may be flexographic plate mounting tapes.

Flexographic plate mounting tapes are used to mount flexographic printing plates to plate cylinders in a flexographic printing press. In some embodiments, the pressure sensitive adhesive of the present disclosure may be used as the cylinder-side adhesive in a flexographic plate mounting tape. The outer surfaces of plate cylinders in a flexographic printing press are typically metal (such as aluminum, steel or stainless steel) or polyurethane. In some cases annular printing sleeves which fit snugly on an underlying tool or cylinder form the outer surfaces of plate cylinders during use. Such printing sleeves are typically polyurethane. Flexographic printing plates may be mounted to plate cylinders (or sleeves) for periods of a few hours to many days, depending on the number of printing runs. Embodiments of the pressure sensitive adhesive of the present disclosure may be used in flexographic plate mounting tapes that are useful on both metal (especially steel) cylinders and polyurethane surface sleeves, that hold well initially, that demonstrate low tape lifting or de-adhesion from the cylinder or sleeve under lifting forces transmitted by the flexographic plate or during plate repositioning or necessary plate remounting, that do not develop excessive adhesion over time, and that can be removed cleanly by hand shortly after application or many days after application from both stainless steel and polyurethane cylinders.

The present adhesive includes basic-functional polar monomers rather than acid-functional monomers, and in limited amounts. Such monomers comprise a polymerizable double bond, such as found in vinyl or (meth)acrylate groups. The basic-functional monomers may be Lewis bases or may contain moieties capable of providing a lone pair of electrons. The basic-functional monomers may be nitrogen-containing species, such as species which include an amine group, an amide group or an imide group. Examples include cyclic amides (lactams) such as N-vinyl caprolactam and N-vinyl pyrrolidone. Examples include acrylamides such as N,N-dimethyl acrylamide. In preferred embodiments, the present adhesives include little or no acid-functional monomer. Additional embodiments are recited in the Selected Embodiments and Examples below.

The present adhesive includes alkyl (meth)acrylate monomers, which are alkyl esters of (meth)acrylic acid. The alkyl groups may be selected from linear and branched alkyl groups comprising 2-12 carbon atoms and branched alkyl groups comprising 13-20 carbon atoms. The possible permutations may be immediately envisioned by the practitioner in the art. Exemplary species include butyl acrylate, 2-ethylhexyl acrylate, octyl acrylate, iso-octyl acrylate, and the like. The present adhesive is typically a random copolymer. The present adhesive is typically not a block copolymer. Additional embodiments are recited in the Selected Embodiments and Examples below.

In some embodiments, the pressure sensitive adhesive of the present disclosure is lightly crosslinked. In some embodiments, crosslinking is achieved by inclusion of polyfunctional monomers, such as divinyls or di(meth) acrylates. Additional crosslinking agents which may be useful in the present disclosure may include, epoxides, aziridines, isocyanates, polycarbodiimides and metal chelates. In some embodiments, crosslinking is achieved by UV activation of photocrosslinkers including trizines and benzophenones. In some embodiments, crosslinking is achieved by inclusion of crosslinking agents during polymerization. In some embodiments, polymerization is accomplished in two or more phases and crosslinking is achieved by inclusion of crosslinking agents during a phase following the first phase of polymerization. In some embodiments, direct high energy irradiation is applied to provide crosslinking such as by electron-beam or gamma irradiation. Additional embodiments are recited in the Selected Embodiments and Examples below.

In some embodiments, polymerization of the adhesive copolymer of the present disclosure is accomplished with little or no solvent. In some embodiments, polymerization of the adhesive copolymer of the present disclosure is accomplished with application of UV radiation, in some cases with use of a photoinitiator. Additional embodiments are recited in the Selected Embodiments and Examples below.

With reference to the FIGURE, a flexographic plate mounting tape 10 according to the present disclosure includes first PSA layer 80 which is the pressure sensitive adhesive of the present disclosure. First PSA layer 80 is an outermost layer of the tape. In the depicted embodiment, first PSA layer 80 is directly bound to first primer layer 75 which is directly bound to first substrate 70. Alternately, First PSA layer 80 is directly bound to first substrate 70 with no intervening primer layer. In some such embodiments, the unprimed surface of first substrate 70 is subjected to one or more treatments known to improve adhesion, which may include corona treatment, etching, abrading, and the like. Alternately or in addition to such treatment of the surface of first substrate 70, in some embodiments the surface of first PSA layer 80 may be subjected to one or more treatments known to improve adhesion, which may include corona treatment, etching, abrading, and the like.

In some embodiments, such as depicted, first substrate 70 is a polymeric foam. In some embodiments, first substrate 70 is an adhesive polymeric foam. Alternately, first substrate 70 is a carrier layer (discussed below). Second PSA layer 30 is the second outermost layer of the tape, located on the face of the tape opposite first PSA layer 80. Typically, first PSA layer 80 is the cylinder side adhesive and second PSA layer 30 is the plate side adhesive. In the depicted embodiment, second PSA layer 30 is directly bound to second primer layer 40 which is directly bound to second substrate 20. Second substrate 20 is typically a carrier layer (discussed below). Alternately, second PSA layer 30 is directly bound to second substrate 20 with no intervening primer layer. In another alternative embodiment, second PSA layer 30 is bound to first substrate 70, either directly, or through second primer layer 40 which is directly bound to both first substrate 70 and second PSA layer 30. In the depicted embodiment, first substrate 70 and second substrate 20 are bound together through internal adhesive layer 55 and third primer layer 60. In some embodiments, third primer layer 60 is omitted and internal adhesive layer 55 is directly bound to second substrate 20. In some embodiments, internal adhesive layer 55 is omitted and third primer layer 60 is directly bound to second substrate 20. In some embodiments, internal adhesive layer 55 and third primer layer 60 are both omitted and first substrate 70 is directly bound to second substrate 20.

In some applications, flexographic printing plate 95 is attached to plate cylinder 90 of a flexographic printing press (not shown) by use of flexographic plate mounting tape 10. Typically, flexographic plate mounting tape 10 is bound to flexographic printing plate 95 through second PSA layer 30 and bound to plate cylinder through first PSA layer 80.

Second PSA layer 30 may comprise any suitable pressure sensitive adhesive. In some embodiments, second PSA layer 30 comprises a poly(meth)acrylate polymer. In some embodiments, second PSA layer 30 comprises a tackified poly(meth)acrylate polymer. In some embodiments, second PSA layer 30 comprises a poly(meth)acrylate polymer comprising units derived from polar monomers in an amount of 0.1-20.0 wt % of the total weight of the polyacrylate polymer, in some embodiments 0.5-10.0 wt %, and in some embodiments 1.0-10.0 wt %. In some embodiments, second PSA layer 30 comprises a poly(meth)acrylate polymer comprising units derived from acrylic acid monomers in an amount of 0.1-10.0 wt % of the total weight of the poly (meth)acrylate polymer, in some embodiments 0.5-10.0 wt %, and in some embodiments 1.0-10.0 wt %. In some embodiments, second PSA layer 30 comprises a tackified rubber. In some embodiments, second PSA layer 30 comprises a tackified natural rubber. In some embodiments, second PSA layer 30 comprises a tackified synthetic rubber.

Internal adhesive layer 55 may comprise any suitable adhesive. In some embodiments, internal adhesive layer 55 may comprise a pressure sensitive adhesive. In various embodiments, the pressure sensitive adhesive may be any of those recited above for use as second PSA layer 30. In some embodiments, internal adhesive layer 55 may comprise a hot melt or heat activated adhesive.

One or both of the outer adhesive layers (first PSA layer 80 and second PSA layer 30) may additionally comprise relief features in their outer surface (not shown) which may function to provide air release channels in the adhesive surface. In some embodiments, the channels have a depth (measured from the top of the adhesive layer to the floor of the channel) of not more than 18% of the thickness of the adhesive layer (measured from the top of the adhesive layer to the bottom of the adhesive layer). In some embodiments, the channels have a depth of not more than 17% of the thickness of the adhesive layer, in some not more than 16%, and in some not more than 15%. In some embodiments, the channels have a depth of at least 4 micrometers, in some at least 5 micrometers, in some at least 6 micrometers, and in some at least 7 micrometers. Applicants have found that adhesive layers having air release channels exceeding these parameters may tear and/or leave adhesive residue when removed. In addition, one or both of the outer adhesive layers (first PSA layer 80 and second PSA layer 30) may bear a release liner (not shown), which is removed for use. In some embodiments, one of the outer adhesive layers (first PSA layer 80 and second PSA layer 30) may bear a release liner (not shown), and the flexographic plate mounting tape 10 may be rolled upon itself for storage and shipping. In some such embodiments, the release liner has an embossed surface facing the adhesive layer which imparts and/or matches relief features in the outer surface of the PSA layer.

In some embodiments, first PSA layer 80 and second PSA layer 30 have a thickness of at least 15 micrometers, in some embodiments at least 20 micrometers, and in some embodiments at least 30 micrometers. In some such embodiments those PSA layers have thickness of less than 200 micrometers, in some less than 100 micrometers, and in some less than 70 micrometers. In some embodiments, internal adhesive layer 55 is subject to the same constraints on thickness. In some embodiments, any of first primer layer 75, second primer layer 30 and third primer layer 60 may have thickness of at least 40 nanometers, in some embodiments at least 80 nanometers, and in some embodiments at least 120 nanometers. In some such embodiments those primer layers may have thickness of less than 50 micrometers, in some less than 10 micrometers, and in some less than 1 micrometer. In some embodiments, wherein one or both of first substrate 70 and/or second substrate 20 may be foam layers, foam layers may have a thickness of at least 200 micrometers, in some embodiments at least 300 micrometers, and in some embodiments at least 400 micrometers. In some such embodiments foam layers may have a thickness of less than 2500 micrometers, in some less than 1500 micrometers, and in some less than 500 micrometers. In some embodiments, wherein one or both of first substrate 70 and/or second substrate 20 may be carrier layers, carrier layers may have a thickness of at least 10 micrometers, in some embodiments at least 15 micrometers, and in some embodiments at least 20 micrometers. In some such embodiments carrier layers may have thickness of less than 120 micrometers, in some less than 80 micrometers, and in some less than 40 micrometers.

A foam layer may comprise any suitable polymeric material. The material of the foam layer is typically resilient and possesses rapid rebound and low compression set characteristics. In some embodiments, a foam layer comprises a polyolefin polymer, such as an ethylene/vinyl acetate (EVA) copolymer, a polyethylene or polyethylene-containing copolymer, a thermoplastic elastomer block copolymer based on isoprene or butadiene, a poly(meth)acrylate polymer, a polyurethane polymer, or a polypropylene polymer; a polyester polymer, or a polycarbonate polymer. In some embodiments, a foam layer comprises as an ethylene/vinyl acetate (EVA) copolymer. Foam layers may be foamed by use of chemical blowing agents, such as inert gasses, air, or chemical species that break down to release gasses upon heating; or physical blowing agents, such as expandable microspheres.

Primer layer(s) may comprise any primer materials or adhesion promoters suitable to aid joining of the layers adjoining the primer layer. In some embodiments, the present disclosure contemplates the use of primers recited in the Examples below. In some embodiments, the present disclosure contemplates the use of primers described in the Selected Embodiments below. In some embodiments, first substrate 70 is an ethylene/vinyl acetate (EVA) copolymer foam and first primer layer 75, joining first PSA layer 80 to first substrate 70, comprises a primer comprising a blend of ethylene/vinyl acetate (EVA) copolymer and silica nanoparticles.

Any suitable silica particles may be used in the primer according to the present disclosure. Some embodiments may make use of colloidal silicas, which may be dispersions of micron or submicron size silica nanoparticles in an aqueous or in a water/organic solvent mixture and having and average primary particle diameter of 200 nanometers or less, preferably 75-5 nanometers or less, and more preferably 50-20 nanometers or less. The average particle size may be determined using transmission electron microscopy. The nanoparticles generally have a surface area greater than about 150 m2/gram, preferably greater than 200 m2/gram, and more preferably greater than 400 m2/gram. The particles preferably have narrow particle size distributions, that is, a polydispersity of 2.0 or less, preferably 1.5 or less. If desired, larger silica particles may be added, in amounts that do not deleteriously decrease the coatability of the composition on a selected substrate, and do not reduce the transmissivity and/or the hydrophilicity. Inorganic silica sols in aqueous media are well known in the art and available commercially. Silica sols in water or water-alcohol solutions are available commercially under such trade names as LUDOX (manufactured by E.I. duPont de Nemours and Co., Inc., Wilmington, Del., USA), NYACOL (available from Nyacol Co., Ashland, Mass.) or NALCO (manufactured by Ondea Nalco Chemical Co., Oak Brook, Ill. USA). One useful silica sol is NALCO 2326 available as a silica sol with mean particle size of 5 nanometers, pH 10.5, and solid content 15% by weight. Other commercially available silica nanoparticles include "NALCO 2327", "NALCO 1115" and "NALCO 1130," commercially available from NALCO Chemical Co., "Remasol SP30," commercially available from Remet Corp., and "LUDOX SM," commercially available from E. I. Du Pont de Nemours Co., Inc.

In some embodiments, non-aqueous silica sols (also called silica organosols) may also be used and are silica sol dispersions wherein the liquid phase is an organic solvent, or an aqueous organic solvent. In the practice of this invention, the silica sol is chosen so that its liquid phase is compatible with the emulsion, and is typically aqueous or an aqueous organic solvent. Silica particles may be spherical, generally spherical, or acicular. The term "acicular" refers to the general needle-like, elongated shape of the particles and may include other sting-like, rod-like, chain-like shapes, as well as filamentary shapes. It will be understood that the initial acicular shaped may be deformed by contact with the acid of the coating composition and the resulting necking or bonding. The average particle size may be determined using transmission electron microscopy. The acicular silica particles are preferably not surface modified. The acicular silica sol may also be prepared as described in U.S. Pat. Nos. 5,597,512 or 5,221,497. Useful acicular silica particles may be obtained as an aqueous suspension under the trade name SNOWTEX-UP by Nissan Chemical Industries (Tokyo, Japan). The mixture consists of 20-21% (w/w) of acicular silica, less than 0.35% (w/w) of Na2O, and water. The particles are about 9 to 15 nanometers in diameter and have lengths of 40 to 300 nanometers. The suspension has a viscosity of <100 mPas at 25° C., a pH of about 9 to 10.5, and a specific gravity of about 1.13 at 20° C. Other useful acicular silica particles may be obtained as an aqueous suspension under the trade name SNOWTEX-PS-S and SNOWTEX-PS-M by Nissan Chemical Industries, having a morphology of a string of pearls. The mixture consists of 20-21% (w/w) of silica, less than 0.2% (w/w) of Na2O, and water. The SNOWTEX-PS-M particles are about 18 to 25 nanometers in diameter and have lengths of 80 to 150 nanometers. The particle size is 80 to 150 by dynamic light scattering methods. The suspension has a viscosity of <100 mPas at 25° C., a pH of about 9 to 10.5, and a specific gravity of about 1.13 at 20° C. The SNOWTEX-PS-S has a particle diameter of 10-15 nm and a length of 80-120 nm. A carrier layer may comprise any suitable polymeric material. In some embodiments, a carrier layer comprises a polyester polymer, a polyethylene or polyethylene-containing copolymer, a polypropylene polymer, or a polycarbonate polymer. In some embodiments, a carrier layer comprises a polyester polymer. Typically, a carrier layer is not a compressible foam. In some embodiments, a carrier layer comprises polyethylene terephthalate (PET). In some embodiments, a carrier layer is an oriented (stretched) film. In some embodiments, a carrier layer is oriented (stretched) on at least one axis prior to application of primer. In some embodiments, a carrier layer is oriented (stretched) on two axes prior to application of primer. In some embodiments, a carrier layer is oriented (stretched) on at least one axis after application of primer. This may aid in penetration of the primer into the carrier. In some embodiments, a carrier layer is oriented (stretched) on two axes after application of primer. In some embodiments, a carrier layer is oriented (stretched) on one axis prior to application of primer and oriented (stretched) on a second axis after application of primer. In some embodiments, a carrier layer additionally comprises fillers. In some embodiments, fillers act as slip additives by creating a microtextured film surface. Any suitable fillers may be used, including clays, aluminum silicate and the like. In some embodiments, one or both faces of a carrier layer is subjected to one or more treatments known to improve adhesion, which may include corona treatment, abrading, and the like.

In some embodiments, the tape is wound into a planetary roll for ease of commercial use. In some such embodiments, a first release liner on a first adhesive side of the flexographic plate mounting tape is removed and the tape is wound onto a second release liner on a second adhesive side of the flexographic plate mounting tape.

In some embodiments, the adhesive according to the present disclosure may additionally be useful as a plate-side adhesive. In some such embodiments, the adhesive layer has a peel force from new plate of greater than or equal to 0.055 Newtons per cm. In some such embodiments, the adhesive layer has a peel force from ink binder residue coated plate of less than or equal to 5.47 Newtons per cm. In some such embodiments, the adhesive layer has a new plate edge lifting resistance of less than or equal to 3.0 mm/48 hours. In some such embodiments, the adhesive layer has a plate touch down resistance of between 0.2 and 8.0 Newtons per cm.

Selected Embodiments

The following embodiments, designated by letter and number, are intended to further illustrate the present disclosure but should not be construed to unduly limit this disclosure.

A1. A pressure sensitive adhesive comprising an adhesive copolymer which is a copolymer of a set of monomers comprising:

a) 41.0-49.0 weight percent of isobornyl acrylate (IBOA);

b) 0.0-4.5 weight percent of one or more basic-functional polar monomers comprising a polymerizable double bond; and c) 46.5-58.9 weight percent of one or more alkyl (meth) acrylate monomers, where the alkyl groups are selected from linear and branched alkyl groups comprising 2-12 carbon atoms and branched alkyl groups comprising 13-20 carbon atoms;

wherein weight percentages are weight percent of all monofunctional monomers comprising the adhesive copolymer.

A2. The pressure sensitive adhesive according to any of the preceding embodiments wherein said alkyl groups are selected from linear and branched alkyl groups comprising at least 4 carbon atoms.

A3. The pressure sensitive adhesive according to any of the preceding embodiments wherein said alkyl groups are selected from linear and branched alkyl groups comprising at least 6 carbon atoms.

A4. The pressure sensitive adhesive according to any of the preceding embodiments wherein said alkyl groups are selected from linear and branched alkyl groups comprising at least 8 carbon atoms.

A5. The pressure sensitive adhesive according to any of the preceding embodiments wherein said alkyl groups are selected from linear and branched alkyl groups comprising not more than 10 carbon atoms.

A6. The pressure sensitive adhesive according to any of the preceding embodiments wherein said alkyl groups are selected from linear and branched alkyl groups comprising not more than 8 carbon atoms.

A7. The pressure sensitive adhesive according to any of the preceding embodiments wherein said alkyl groups are selected from linear alkyl groups.

A8. The pressure sensitive adhesive according to any of the preceding embodiments wherein said alkyl groups are selected from branched alkyl groups.

A9. The pressure sensitive adhesive according to any of the preceding embodiments wherein said one or more alkyl (meth)acrylate monomers are a single alkyl (meth)acrylate monomer.

A10. The pressure sensitive adhesive according to any of the preceding embodiments wherein said one or more basic-functional polar monomers comprising a polymerizable double bond are selected from nitrogen-containing species.

A11. The pressure sensitive adhesive according to any of the preceding embodiments wherein said one or more basic-functional polar monomers comprising a polymerizable double bond are selected from species which include an amine group, an amide group or an imide group.

A12. The pressure sensitive adhesive according to any of the preceding embodiments wherein said one or more basic-functional polar monomers comprising a polymerizable double bond are selected from species which include an amide group.

A13. The pressure sensitive adhesive according to any of the preceding embodiments wherein said one or more basic-functional polar monomers comprising a polymerizable double bond are selected from species which include a cyclic amide (lactam) moiety.

A14. The pressure sensitive adhesive according to any of the preceding embodiments wherein said one or more basic-functional polar monomers comprising a polymerizable double bond comprise N-vinyl caprolactam.

A15. The pressure sensitive adhesive according to any of the preceding embodiments wherein said one or more basic-functional polar monomers comprising a polymerizable double bond are a single basic-functional polar monomers comprising a polymerizable double bond.

A16. The pressure sensitive adhesive according to any of the preceding embodiments wherein said one or more basic-functional polar monomers comprising a polymerizable double bond are N-vinyl caprolactam.

A17. The pressure sensitive adhesive according to any of the preceding embodiments wherein the set of monomers comprises not less than 41.5 weight percent of isobornyl acrylate (IBOA).

A18. The pressure sensitive adhesive according to any of the preceding embodiments wherein the set of monomers comprises not less than 41.8 weight percent of isobornyl acrylate (IBOA).

A19. The pressure sensitive adhesive according to any of the preceding embodiments wherein the set of monomers comprises not less than 42.0 weight percent of isobornyl acrylate (IBOA).

A20. The pressure sensitive adhesive according to any of the preceding embodiments wherein the set of monomers comprises not less than 42.3 weight percent of isobornyl acrylate (IBOA).

A21. The pressure sensitive adhesive according to any of the preceding embodiments wherein the set of monomers comprises not less than 42.5 weight percent of isobornyl acrylate (IBOA).

A22. The pressure sensitive adhesive according to any of the preceding embodiments wherein the set of monomers comprises not less than 42.8 weight percent of isobornyl acrylate (IBOA).

A23. The pressure sensitive adhesive according to any of the preceding embodiments wherein the set of monomers comprises not less than 43.0 weight percent of isobornyl acrylate (IBOA).

A24. The pressure sensitive adhesive according to any of the preceding embodiments wherein the set of monomers comprises not less than 44.0 weight percent of isobornyl acrylate (IBOA).

A25. The pressure sensitive adhesive according to any of the preceding embodiments wherein the set of monomers comprises not less than 44.5 weight percent of isobornyl acrylate (IBOA).

A26. The pressure sensitive adhesive according to any of the preceding embodiments wherein the set of monomers comprises not more than 48.0 weight percent of isobornyl acrylate (IBOA).

A27. The pressure sensitive adhesive according to any of the preceding embodiments wherein the set of monomers comprises not more than 47.0 weight percent of isobornyl acrylate (IBOA).

A28. The pressure sensitive adhesive according to any of the preceding embodiments wherein the set of monomers comprises not more than 46.0 weight percent of isobornyl acrylate (IBOA).

A29. The pressure sensitive adhesive according to any of the preceding embodiments wherein the set of monomers comprises not more than 45.5 weight percent of isobornyl acrylate (IBOA).

A30. The pressure sensitive adhesive according to any of the preceding embodiments wherein the set of monomers comprises not more than 45.0 weight percent of isobornyl acrylate (IBOA).

A31. The pressure sensitive adhesive according to any of the preceding embodiments wherein the set of monomers comprises not less than 0.1 weight percent of said one or more basic-functional polar monomers comprising a polymerizable double bond.

A32. The pressure sensitive adhesive according to any of the preceding embodiments wherein the set of monomers comprises not less than 0.3 weight percent of said one or more basic-functional polar monomers comprising a polymerizable double bond.

A33. The pressure sensitive adhesive according to any of the preceding embodiments wherein the set of monomers comprises not less than 0.5 weight percent of said one or more basic-functional polar monomers comprising a polymerizable double bond.

A34. The pressure sensitive adhesive according to any of the preceding embodiments wherein the set of monomers comprises not less than 1.0 weight percent of said one or more basic-functional polar monomers comprising a polymerizable double bond.

A35. The pressure sensitive adhesive according to any of the preceding embodiments wherein the set of monomers comprises not more than 4.0 weight percent of said one or more basic-functional polar monomers comprising a polymerizable double bond.

A36. The pressure sensitive adhesive according to any of the preceding embodiments wherein the set of monomers comprises not more than 3.0 weight percent of said one or more basic-functional polar monomers comprising a polymerizable double bond.

A37. The pressure sensitive adhesive according to any of the preceding embodiments wherein the set of monomers comprises not more than 2.5 weight percent of said one or more basic-functional polar monomers comprising a polymerizable double bond.

A38. The pressure sensitive adhesive according to any of the preceding embodiments wherein the set of monomers comprises not more than 2.0 weight percent of said one or more basic-functional polar monomers comprising a polymerizable double bond.

A39. The pressure sensitive adhesive according to any of the preceding embodiments wherein the set of monomers comprises not more than 1.8 weight percent of said one or more basic-functional polar monomers comprising a polymerizable double bond.

A40. The pressure sensitive adhesive according to any of the preceding embodiments wherein the set of monomers comprises not more than 1.6 weight percent of said one or more basic-functional polar monomers comprising a polymerizable double bond.

A41. The pressure sensitive adhesive according to any of the preceding embodiments wherein the set of monomers comprises not more than 1.5 weight percent of said one or more basic-functional polar monomers comprising a polymerizable double bond.

A42. The pressure sensitive adhesive according to any of the preceding embodiments wherein the set of monomers comprises not more than 1.4 weight percent of said one or more basic-functional polar monomers comprising a polymerizable double bond.

A43. The pressure sensitive adhesive according to any of the preceding embodiments wherein the set of monomers comprises not less than 52.0 weight percent of said one or more alkyl (meth)acrylate monomers.

A44. The pressure sensitive adhesive according to any of the preceding embodiments wherein the set of monomers comprises not less than 54.0 weight percent of said one or more alkyl (meth)acrylate monomers.

A45. The pressure sensitive adhesive according to any of the preceding embodiments wherein the set of monomers comprises not more than 57.0 weight percent of said one or more alkyl (meth)acrylate monomers.

A46. The pressure sensitive adhesive according to any of the preceding embodiments wherein the set of monomers comprises no more than 1.80 weight percent of acid-functional monomers.

A47. The pressure sensitive adhesive according to any of the preceding embodiments wherein the set of monomers comprises no more than 1.50 weight percent of acid-functional monomers.

A48. The pressure sensitive adhesive according to any of the preceding embodiments wherein the set of monomers comprises no more than 1.00 weight percent of acid-functional monomers.

A49. The pressure sensitive adhesive according to any of the preceding embodiments wherein the set of monomers comprises no more than 0.20 weight percent of acid-functional monomers.

A50. The pressure sensitive adhesive according to any of the preceding embodiments wherein the set of monomers comprises no more than 0.10 weight percent of acid-functional monomers.

A51. The pressure sensitive adhesive according to any of the preceding embodiments wherein the set of monomers comprises no more than 0.01 weight percent of acid-functional monomers.

A52. The pressure sensitive adhesive according to any of the preceding embodiments wherein the set of monomers comprises no acid-functional monomers.

A53. The pressure sensitive adhesive according to any of the preceding embodiments comprising not more than 1.0 weight percent of filler materials.

A54. The pressure sensitive adhesive according to any of the preceding embodiments comprising not more than 0.5 weight percent of filler materials.

A55. The pressure sensitive adhesive according to any of the preceding embodiments comprising not more than 0.1 weight percent of filler materials.

A56. The pressure sensitive adhesive according to any of the preceding embodiments comprising no filler materials.

A57. The pressure sensitive adhesive according to any of embodiments A52-A55 wherein filler materials include fibrous and particulate fillers.

A58. The pressure sensitive adhesive according to of embodiments A52-A56 wherein filler materials include natural fibers, polymeric fibers and inorganic fibers.

A59. The pressure sensitive adhesive according to of embodiments A52-A57 wherein particulate fillers include polymeric, metal, metal oxide, ceramic, mineral and glass particulate fillers.

A60. The pressure sensitive adhesive according to any of the preceding embodiments wherein the set of monomers additionally comprises a monomer comprising two or more polymerizable double bonds in an amount equal to 0.01-2.0 percent of the weight of all monofunctional monomers comprising the adhesive copolymer.

A61. The pressure sensitive adhesive according to any of the preceding embodiments wherein the set of monomers additionally comprises a diacrylate monomer in an amount equal to 0.01-2.0 percent of the weight of all monofunctional monomers comprising the adhesive copolymer.

A62. The pressure sensitive adhesive according to any of the preceding embodiments wherein the adhesive polymer is crosslinked.

A63. The pressure sensitive adhesive according to any of the preceding embodiments wherein the adhesive polymer is crosslinked by UV activation of one or more crosslinkers.

A64. The pressure sensitive adhesive according to any of the preceding embodiments wherein the adhesive polymer is crosslinked by use of one or more crosslinkers selected from the group consisting of: epoxides, aziridines, isocyanates, polycarbodiimides and metal chelates.

A65. The pressure sensitive adhesive according to embodiment A63 or A64 wherein the one or more crosslinkers are present in an amount of not more than 1.2 weight percent based on the weight of the pressure sensitive adhesive.

AM1. The pressure sensitive adhesive according to any of embodiments A1-A65 which is polymerized from a monomer mixture containing no more than 5 weight percent of common organic solvents.

AM2. The pressure sensitive adhesive according to any of embodiments A1-A65 which is polymerized from a monomer mixture containing no more than 1 weight percent of common organic solvents.

AM3. The pressure sensitive adhesive according to any of embodiments A1-A65 or AM1-AM2 containing no more than 0.5 weight percent of common organic solvents.

AM4. The pressure sensitive adhesive according to any of embodiments A1-A65 or AM1-AM3 which is polymerized from a monomer mixture by irradiation with UV light.

AM5. The pressure sensitive adhesive according to any of embodiments A1-A65 or AM1-AM4 which is polymerized from a monomer mixture additionally comprising a photoinitiator.

AM6. The pressure sensitive adhesive according to any of embodiments A1-A65 or AM1-AM5 which is polymerized from a monomer mixture additionally comprising a crosslinker.

T1. A tape comprising a first pressure sensitive adhesive layer borne on a first substrate, wherein the first pressure sensitive adhesive layer comprises the pressure sensitive adhesive according to any of embodiments A1-A65 or AM1-AM6, wherein the first pressure sensitive adhesive layer is an outermost layer of the tape.

T2. The tape according to embodiment T1 which is a flexographic plate mounting tape for adhering a flexographic printing plate to a plate cylinder in a flexographic printing press.

T3. The tape according to embodiment T2 wherein the first pressure sensitive adhesive layer is the cylinder-side adhesive of the flexographic plate mounting tape.

T4. The tape according to any of embodiments T1-T3 wherein the first substrate is a polymeric foam.

T5. The tape according to any of embodiments T1-T3 wherein the first substrate is an ethylene/vinyl acetate copolymer foam.

T6. The tape according to any of embodiments T1-T5 wherein the first pressure sensitive adhesive layer is directly bound to the first substrate.

T7. The tape according to any of embodiments T1-T5 wherein the first pressure sensitive adhesive layer is directly bound to a first primer layer which is directly bound to the first substrate.

T8. The tape according to embodiment T7 wherein the first primer layer comprises an ethylene/vinyl acetate copolymer.

T9. The tape according to embodiment T7 wherein the first primer layer comprises a primer according to any of embodiments P1-P28.

T10. The tape according to any of embodiments T1-T9 additionally comprising a second pressure sensitive adhesive layer which is an outermost layer of the tape.

T11. The tape according to embodiment T10 which is a flexographic plate mounting tape for adhering a flexographic printing plate to a plate cylinder in a flexographic printing press, wherein the second pressure sensitive adhesive layer is the plate-side adhesive of the flexographic plate mounting tape.

T12. The tape according to any of embodiments T1-T11 additionally comprising a second substrate.

T13. The tape according to embodiment T12 wherein the second substrate is a carrier layer.

T14. The tape according to any of embodiments T12-T13 additionally comprising a second pressure sensitive adhesive layer borne on the second substrate, wherein the second pressure sensitive adhesive layer is an outermost layer of the tape.

T15. The tape according to embodiment T14 wherein the second pressure sensitive adhesive layer is directly bound to the second substrate.

T16. The tape according to embodiment T14 wherein the second pressure sensitive adhesive layer is directly bound to a second primer layer which is directly bound to the second substrate.

T17. The tape according to any of embodiments T12-T16 wherein the first substrate is bound to the second substrate.

T18. The tape according to embodiment T17 wherein the first substrate is directly bound to the second substrate.

T19. The tape according to embodiment T17 wherein the first substrate is directly bound to an internal adhesive layer which is directly bound to the second substrate.

T20. The tape according to embodiment T17 wherein the first substrate is directly bound to an internal adhesive layer which is directly bound to a third primer layer which is directly bound to the second substrate.

T21. The tape according to any of embodiments T1-T20 comprising the construction according to any of embodiments PL1-PL18.

P1. A primer for adhesion of adhesives to metallic or polymeric substrates, the primer comprising an intimate mixture of a binding polymer comprising pendent polar functional groups and nanoparticles selected from silica, alumina and calcite nanoparticles.

P2. The primer according to embodiment P1 wherein the nanoparticles have an average diameter of between 1 and 1000 nanometers.

P3. The primer according to any of embodiments P1-P2 wherein the nanoparticles have an average diameter of at least 5 nanometers.

P4. The primer according to any of embodiments P1-P2 wherein the nanoparticles have an average diameter of at least 10 nanometers.

P5. The primer according to any of embodiments P1-P2 wherein the nanoparticles have an average diameter of at least 15 nanometers.

P6. The primer according to any of embodiments P1-P5 wherein the nanoparticles have an average diameter of not more than 200 nanometers.

P7. The primer according to any of embodiments P1-P5 wherein the nanoparticles have an average diameter of not more than 150 nanometers.

P8. The primer according to any of embodiments P1-P5 wherein the nanoparticles have an average diameter of not more than 100 nanometers.

P9. The primer according to any of embodiments P1-P5 wherein the nanoparticles have an average diameter of not more than 80 nanometers.

P10. The primer according to any of embodiments P1-P5 wherein the nanoparticles have an average diameter of not more than 50 nanometers.

P11. The primer according to any of embodiments P1-P10 wherein the nanoparticles are silica nanoparticles.

P12. The primer according to any of embodiments P1-P10 wherein the nanoparticles are alumina nanoparticles.
P13. The primer according to any of embodiments P1-P10 wherein the nanoparticles are calcite nanoparticles.
P14. The primer according to any of embodiments P1-P13 wherein the pendent polar functional groups are non-ionic.
P15. The primer according to any of embodiments P1-P14 wherein the pendent polar functional groups comprise carbonyl groups.
P16. The primer according to any of embodiments P1-P15 wherein the pendent polar functional groups are ester groups.
P17. The primer according to any of embodiments P1-P16 wherein the binding polymer is a polyolefin.
P18. The primer according to any of embodiments P1-P17 wherein the binding polymer is a polymer or copolymer of vinyl acetate.
P19. The primer according to any of embodiments P1-P18 wherein the binding polymer is an ethylene/vinyl acetate copolymer.
P20. The primer according to any of embodiments P1-P18 wherein the binding polymer is an ethylene/vinyl acetate copolymer with a vinyl acetate content between 4.0 and 36.0 weight percent.
P21. The primer according to any of embodiments P1-P20 comprising binding polymer and nanoparticles in a weight ratio of between 1:1 and 10:1.
P22. The primer according to embodiment P21 comprising binding polymer and nanoparticles in a weight ratio of not less than 1.5:1.
P23. The primer according to embodiment P21 comprising binding polymer and nanoparticles in a weight ratio of not less than 2:1.
P24. The primer according to embodiment P21 comprising binding polymer and nanoparticles in a weight ratio of not less than 2.5:1.
P25. The primer according to any of embodiments P21-P24 comprising binding polymer and nanoparticles in a weight ratio of not more than 7:1.
P26. The primer according to any of embodiments P21-P24 comprising binding polymer and nanoparticles in a weight ratio of not more than 5:1.
P27. The primer according to any of embodiments P21-P24 comprising binding polymer and nanoparticles in a weight ratio of not more than 4:1.
P28. The primer according to any of embodiments P20-P23 comprising binding polymer and nanoparticles in a weight ratio of not more than 3.5:1.
P29. The primer according to any of embodiments P1-P27 which is a primer for adhesion of adhesives to polymeric substrates.
P30. The primer according to any of embodiments P1-P27 which is a primer for adhesion of adhesives to metallic substrates.
P31. The primer according to any of embodiments P1-P10 or P14-P29 wherein the nanoparticles are selected from the group consisting of silica, alumina, calcite, clay, aluminum silicate, $TiO_2$ and $ZrO_2$ nanoparticles.
PL1. A construction comprising a first primer layer comprising the primer according to any of embodiments P1-P31.
PL2. The construction according to embodiment PL1 wherein the first primer layer has a thickness of 1-25 micrometers.
PL3. The construction according to embodiment PL2 wherein the first primer layer has a thickness of not less than 2 micrometers.
PL4. The construction according to embodiment PL2 wherein the first primer layer has a thickness of not less than 3 micrometers.
PL5. The construction according to embodiment PL2 wherein the first primer layer has a thickness of not less than 4 micrometers.
PL6. The construction according to embodiment PL2 wherein the first primer layer has a thickness of not less than 5 micrometers.
PL7. The construction according to any of embodiments PL2-PL6 wherein the first primer layer has a thickness of not more than 20 micrometers.
PL8. The construction according to any of embodiments PL2-PL6 wherein the first primer layer has a thickness of not more than 15 micrometers.
PL9. The construction according to any of embodiments PL2-PL6 wherein the first primer layer has a thickness of not more than 10 micrometers.
PL10. The construction according to any of embodiments PL1-PL9 wherein the first primer layer is directly bound to a first layer of adhesive.
PL11. The construction according to embodiment PL10 wherein the first layer of adhesive is a layer of pressure sensitive adhesive.
PL12. The construction according to embodiment PL10 wherein the first layer of adhesive is a layer of heat-activated adhesive.
PL13. The construction according to any of embodiments PL10-PL12 wherein the first layer of adhesive is a layer of poly(meth)acrylate adhesive.
PL14. The construction according to any of embodiments PL10-PL11 wherein the first layer of adhesive comprises the pressure sensitive adhesive according to any of embodiments A1-A64 or AM1-AM6.
PL15. The construction according to any of embodiments PL1-PL14 wherein the first primer layer is directly bound to a first substrate layer.
PL16. The construction according to embodiment PL15 wherein the first substrate layer is a polymeric layer.
PL17. The construction according to embodiment PL15 wherein the first substrate layer is a polymeric foam layer.
PL18. The construction according to any of embodiments PL15-PL17 wherein the first substrate layer comprises polyolefin.
PL19. The construction according to any of embodiments PL15-PL17 wherein the first substrate layer comprises ethylene/vinyl acetate copolymer.
PL20. The construction according to embodiment PL14 wherein the first substrate layer is a metallic layer.
ARC1. A pressure sensitive adhesive layer having a thickness, the pressure sensitive adhesive layer comprising air release channels in the adhesive surface having a depth, wherein the depth of the air release channels is not more than 18% of the thickness of the pressure sensitive adhesive layer.
ARC2. The pressure sensitive adhesive layer according to embodiment ARC1 wherein the depth of the air release channels is not more than 17% of the thickness of the pressure sensitive adhesive layer.
ARC3. The pressure sensitive adhesive layer according to embodiment ARC1 wherein the depth of the air release channels is not more than 16% of the thickness of the pressure sensitive adhesive layer.
ARC4. The pressure sensitive adhesive layer according to embodiment ARC1 wherein the depth of the air release channels is not more than 15% of the thickness of the pressure sensitive adhesive layer.

ARC5. The pressure sensitive adhesive layer according to any of embodiments ARC1-ARC4 wherein the depth of the air release channels is at least 4 microns.

ARC6. The pressure sensitive adhesive layer according to any of embodiments ARC1-ARC4 wherein the depth of the air release channels is at least 5 microns.

ARC7. The pressure sensitive adhesive layer according to any of embodiments ARC1-ARC4 wherein the depth of the air release channels is at least 6 microns.

ARC8. The pressure sensitive adhesive layer according to any of embodiments ARC1-ARC4 wherein the depth of the air release channels is at least 7 microns.

ARC9. The pressure sensitive adhesive layer according to any of embodiments ARC1-ARC8 which comprises the pressure sensitive adhesive according to any of embodiments A1-A65 or AM1-AM6.

ART1. A tape comprising a first pressure sensitive adhesive layer borne on a first substrate, wherein the first pressure sensitive adhesive layer is the pressure sensitive adhesive layer according to any of embodiments ARC1-ARC9, wherein the first pressure sensitive adhesive layer is an outermost layer of the tape, and wherein the air release channels face outward.

ART2. The tape according to embodiment ART1 which is a flexographic plate mounting tape for adhering a flexographic printing plate to a plate cylinder in a flexographic printing press.

ART3. The tape according to embodiment ART2 wherein the first pressure sensitive adhesive layer is the cylinder-side adhesive of the flexographic plate mounting tape.

ART4. The tape according to any of embodiments ART1-ART3 wherein the first substrate is a polymeric foam.

ART5. The tape according to any of embodiments ART1-ART3 wherein the first substrate is an ethylene/vinyl acetate copolymer foam.

ART6. The tape according to any of embodiments ART1-ART5 wherein the first pressure sensitive adhesive layer is directly bound to the first substrate.

ART7. The tape according to any of embodiments ART1-ART5 wherein the first pressure sensitive adhesive layer is directly bound to a first primer layer which is directly bound to the first substrate.

ART5. The tape according to embodiment ART7 wherein the first primer layer comprises an ethylene/vinyl acetate copolymer.

ART8. The tape according to embodiment ART7 wherein the first primer layer comprises a primer according to any of embodiments P1-P28.

ART10. The tape according to any of embodiments ART1-ART9 additionally comprising a second pressure sensitive adhesive layer which is an outermost layer of the tape.

ART11. The tape according to embodiment ART10 which is a flexographic plate mounting tape for adhering a flexographic printing plate to a plate cylinder in a flexographic printing press, wherein the second pressure sensitive adhesive layer is the plate-side adhesive of the flexographic plate mounting tape.

ART12. The tape according to any of embodiments ART1-ART11 additionally comprising a second substrate.

ART13. The tape according to embodiment ART12 wherein the second substrate is a carrier layer.

ART14. The tape according to any of embodiments ART12-ART13 additionally comprising a second pressure sensitive adhesive layer borne on the second substrate, wherein the second pressure sensitive adhesive layer is an outermost layer of the tape.

ART15. The tape according to embodiment ART14 wherein the second pressure sensitive adhesive layer is directly bound to the second substrate.

ART16. The tape according to embodiment ART14 wherein the second pressure sensitive adhesive layer is directly bound to a second primer layer which is directly bound to the second substrate.

ART17. The tape according to any of embodiments ART12-ART16 wherein the first substrate is bound to the second substrate.

ART18. The tape according to embodiment ART17 wherein the first substrate is directly bound to the second substrate.

ART19. The tape according to embodiment ART17 wherein the first substrate is directly bound to an internal adhesive layer which is directly bound to the second substrate.

ART20. The tape according to embodiment ART17 wherein the first substrate is directly bound to an internal adhesive layer which is directly bound to a third primer layer which is directly bound to the second substrate.

ART21. The tape according to any of embodiments ART1-ART20 comprising the construction according to any of embodiments PL1-PL18.

One or both of the outer adhesive layers (first PSA layer 80 and second PSA layer 30) may additionally comprise relief features in their outer surface (not shown) which may function to provide air release channels in the adhesive surface. In addition, one or both of the outer adhesive layers (first PSA layer 80 and second PSA layer 30) may bear a release liner (not shown), which is removed for use. In some embodiments, one of the outer adhesive layers (first PSA layer 80 and second PSA layer 30) may bear a release liner (not shown), and the flexographic plate mounting tape 10 may be rolled upon itself for storage and shipping. In some such embodiments, the release liner has an embossed surface facing the adhesive layer which imparts and/or matches relief features in the outer surface of the PSA layer.

Objects and advantages of embodiments described in this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Aldrich Chemical Co., Milwaukee, Wis., or may be synthesized by known methods.

Materials

| Designation | Description |
| --- | --- |
| EVA Foam 1 | A closed cell, chemically crosslinked ethylene/vinyl acetate copolymer (EVA) foam having a nominal density of 0.256 grams/cubic centimeter 16 pounds/cubic foot) and a thickness of approximately 432 micrometers (0.017 inches). |
| EVA Foam 2 | A closed cell, chemically crosslinked ethylene/vinyl acetate copolymer (EVA) foam having a nominal density of 0.171 grams/cubic centimeter (10.7 pounds/cubic foot) and a thickness of approximately 432 micrometers (0.017 inches). |
| Thermoplastic Adhesion Promoter | An ethylene/vinyl acetate copolymer (EVA) resin dispersion in water having a nominal solids concentration of 40 weight %, and a pH of 10, available under the trade designation ADCOTE 37P295 from Dow Chemical Company, Midland, MI. |

| Designation | Description |
|---|---|
| Polyurethane Sleeve 1 | A cylindrical, fiber reinforced, plastic flexographic printing sleeve having a polyurethane outer surface, an outside diameter of 6.750 inches (17.145 centimeters), and wall thickness of 0.080 inches (2.03 millimeters), available under the trade designation ROTEC BLUE LIGHT SLEEVE from Flint Group Flexographic Products, Arden, NC. |
| Polyurethane Sleeve 2 | A cylindrical, fiber reinforced, plastic flexographic printing sleeve having a polyurethane outer surface, an outside diameter of 3.859 inches (98.0 millimeters), and wall thickness of 0.204 inches (5.18 millimeters), available under the trade designation ROTEC BLUE LIGHT SLEEVE from Flint Group Flexographic Products, Arden, NC. |
| Plastic Film Reinforcement | A translucent, heat sealable laminate of polyester film and an ethylene vinyl acetate copolymer (EVA) heat seal layer having a sealant layer thickness of 35.3 micrometers and a total thickness of 49.5 micrometers, available under the trade designation 3M SCOTCHPAK LF200M PACKAGING FILM from 3M Company, St. Paul, MN. |
| Silica | An aqueous dispersion of fumed silica, a milky-white liquid with a pH value of about 9.3, a density at 20° C. of 1.29 grams per cubic centimeter, a nominal $SiO_2$ content of 40%, available under the trade designation NALCO 2327, from Nalco Water, an Ecolab Company, Napierville, IL. |
| IOA | Isooctyl acrylate, a colorless liquid containing monomethyl ether hydroquinone as an inhibitor, >90 weight %, may be obtained from Sigma-Aldrich Company, LLC, St. Louis, MO. |
| 2EHA | 2-Ethylhexyl acrylate, a colorless liquid with a nominal purity of 98%, and inhibited with monomethyl ether hydroquinone available from BASF Corporation, Florham Park, NJ. |
| AA | Acrylic acid, a colorless liquid, unsaturated carboxylic acid, available from BASF Corporation, Florham Park, NJ.. |
| IBOA | Isobornyl acrylate, a colorless liquid, technical grade, containing monomethyl ether hydroquinone as an inhibitor, available from Osaka Organic Chemical Industries, Limited, Osaka, Japan. |
| NVC | N-Vinylcaprolactam, 98% assay, a solid having a melting point of 35° C., having a molecular weight of 139.2 grams per mole, available from Ashland, Incorporated, Covington, KY. |
| NNDMA | N,N-Dimethylacrylamide, 98% minimum assay, stabilized with 500 ppm monomethylether of hydroquinone (MHQ) available from Jarchem Industries Incorporated, Newark, NJ. |
| Photoinitiator | 2,2-Dimethoxy-2-phenylacetophenone, a photoinitiator having a melting point between 64° C. and 67° C. and a molecular weight of 256.3 grams per mole, available under the trade designation IRGACURE 651 available from BASF Corporation, Florham Park, NJ. |
| HDDA | 1,6-Hexanediol diacrylate, having a molecular weight of 226.3 grams per mole, stabilized with hydroquinone, available from Alfa Aesar, Tewksbury, MA. |
| Triazine | 2,4-bis(trichloromethyl)-6-(3,4 dimethoxyphenyl)-s-triazine, made by the co-trimerization of an arylnitrile with trichloroacetonitrile in the presence of HCl gas and a Lewis acid such as $AlCl_3$, $AlBr_3$, etc., using the procedure described in *Bulletin of the Chemical Society Japan*, Volume 42, page 2924 (1969). |
| Embossed Release Liner 1 | A polyester film having a differential silicone release coating on each side and embossed on one side was provided as described in Example 1 of EP1800865 A1. |
| Embossed Release Liner 2 | A polyester film having a differential silicone release coating on each side and embossed on one side was provided as described in Example 1 of EP1800865 A1, except the center to center distance between ridges was approximately 1.69 millimeters, the height of the ridges was approximately 25.1 micrometers, the height of the intersections was approximately 20.9 micrometers, and ridge width was approximately 200 micrometers. |
| IOTG | Isooctyl thioglycolate, having a molecular weight of 204.3 grams per mole, may be obtained from Sigma-Aldrich Company, LLC, St. Louis, MO. |
| PRIMER 94 | A fast drying and curing solvent-based primer, containing acrylate polymer and chlorinated polyolefin, available under the trade designation 3M TAPE PRIMER 94 from 3M Company, Saint Paul, MN. |
| SS Plate | Stainless steel plates measuring 2 inches by 6 inches by 0.050 inches (5.1 centimeters by 15.2 centimeters by 1.27 millimeters), having a bright annealed finish and a surface roughness height of 2.0 ± 1 micro inches arithmetical average from the mean line, Type 304, available from ChemInstruments, Fairfield, OH. |
| Printing Plate | An unprocessed photopolymer sheet, DUPONT CYREL DPR 067 (DuPont Packaging Graphics, Wilmington, DE), was processed using industry standard methods to provide a flexographic printing plate having 0.005 inch (127 micrometers) thick polyester base film having on one side a continuous, cured photopolymer layer with a nontacky surface, a thickness of 0.062 inch (1.6 millimeters), and a Shore A Hardness of about 69. This was obtained as 067 DPR Varnish Plate from Southern Graphics Systems Company (SGS co), Brooklyn Park, MN. |

Test Methods

Peel Adhesion Strength from Polyurethane Surface

Peel adhesion strength from a polyurethane surface was measured according to ASTM D3330/D 3330M-02: "Peel Adhesion of Pressure Sensitive Tape", Method F with modifications as follows. Double coated flexographic plate mounting tape was cut to provide strips measuring 7 inches by 1 inches (152 millimeters by 25 millimeters). A two inch long section of Polyurethane Sleeve 1 was cleaned using a mixture of isopropanol and water (1:1/w:w) using a lint and scent-free tissue and allowed to dry. Next, the protective release liner, if present, was removed from the first side adhesive (also referred to as the inner, sleeve side adhesive) of a pressure sensitive adhesive (PSA) tape and the exposed pressure sensitive adhesive was applied by hand to lightly adhere the tape piece lengthwise around the circumference of the sleeve. The sleeve/tape combination was then rotated while a rubber roller having a diameter of 37 millimeters, a width of 46 millimeters, and a Shore A hardness of 61 was used to roll down the adhesive tape around the sleeve circumference several times using firm hand pressure. The polyurethane sleeve section with the PSA tape thereon was then aged under one of two conditions as specified in the Examples below.

After aging the sleeve section was allowed to cool to room temperature (21° C.) after which the release liner was removed from the second (outer) adhesive surface. The sleeve/tape article was then mounted in a vertical position on a freely moving spindle that was mounted to the test platen of a Model TL-2300 Intermediate Range Slip/Peel Tester (IMASS Incorporated, Accord, Mass.). The tape was then removed from the sleeve at an angle of 90 degrees as the platen moved in horizontal position at a rate of 50 feet/minute (15.2 meters/minute) resulting in a tape removal rate of 50 feet/minute (15.2 meters/minute). After a delay of 0.1 seconds data was collected over a period of 0.2 seconds and used to obtain peel adhesion strength values which were then averaged to provide the final recorded value. The results of between one and five test strips were averaged and reported in Newtons/centimeter (N/cm). Unless otherwise noted, no tape residue was observed on the exposed sleeve after tape removal. This test was intended to measure adhesion to a polyurethane flexographic print cylinder.

Peel Adhesion Strength from Metallic Surface

Peel adhesion strength from a metallic surface was measured as described in the test method "Peel Adhesion Strength from Polyurethane Surface" above with the following modifications. This test was intended to simulate adhesion to a metallic flexographic print cylinder. A SS Plate was used as the test panel; The tape specimen was gently positioned lengthwise along the test panel surface and mechanically rolled down at 12 inches/minute (30.5 centimeters/minute) with a 4.5 pound (2.04 kilogram) rubber roller having a Shore A hardness of 80. After conditioning the SS Plate with PSA tape thereon was positioned vertically in a cavity in the platen surface with the length of the SS Plate parallel to the platen surface. The cavity was at an angle of 45 degrees with respect to the direction of the platen motion. The tape was attached to a load cell that was positioned at an angle of 90 degrees with respect to the SS Plate. The platen was moved at a rate of 70.75 feet/minute (21.6 meters/minute) to provide a tape removal rate of 50 feet/minute (15.2 meters/minute). The results of between one and five test strips were averaged and reported in Newtons/centimeter (N/cm).

For test specimens reported in Table 4 below, more careful inspection of the tape adhesive surface was made after the tape was removed from the SS plate using a 5× hand held magnifying lens. The following observed modes were recorded and reported for each stripe tested:

C0 the adhesive surface was smooth and visually unaltered

C1 one to six adhesive tears per 51.6 square centimeters of adhesive surface area each with 2 millimeters or smaller diameter and no observable cohesive transfer to the stainless steel plate C2 more than 7 adhesive tears per 51.6 square centimeters of adhesive surface or any adhesive tear with greater than 2 millimeter diameter and no cohesive transfer to the stainless steel plate C3 multiple adhesive tears and at least one area of cohesive transfer to the stainless steel plate The capacity for clean removal and reuse may be important in many applications for pressure sensitive tapes, however they are of particular importance to flexographic plate mounting tapes. In this application, printing plates may be removed and reapplied to print cylinders many times. Removal and reapplication is best accomplished without undue loss or gain of adhesive strength and without deposit of adhesive residue, which may compromise print quality.

Quick Stick Adhesion to a Polyurethane Surface

Quick stick adhesion strength from a polyurethane surface was measured as described in the test method "Peel Adhesion Strength from Polyurethane Surface" above with the following modifications. The tape samples were conditioned and tested at 21° C. and 50% relative humidity (RH). The tape sample was rolled down using a 1.1 pound (0.5 kilogram) rubber roller having a Shore A durometer of 74. The roller was maintained directly above the sleeve/tape combination. The sleeve was rotated one time each in a clockwise and counterclockwise direction. The tape was then removed immediately as described previously. The results of between one and five test strips were averaged and reported in Newtons/centimeter (N/cm). This test was intended to evaluate the immediate, initial peel adhesion strength to a polyurethane flexographic print cylinder and the repositionability of the tape thereto.

Quick Stick Adhesion from Metallic Surface

Quick stick adhesion strength from a metallic surface was measured as described in the test method "Peel Adhesion Strength from Metallic Surface" above with the following modifications. The tape samples were conditioned and tested at 21° C. and 50% relative humidity (RH). The tape sample was rolled down one time in each direction using a 1.1 pound (0.5 kilogram) rubber roller having a Shore A durometer of 74. The tape was then removed immediately as described previously. The results of between one and five test strips were averaged and reported in Newtons/centimeter (N/cm). This test was intended to evaluate the immediate, initial peel adhesion strength to a metallic flexographic print cylinder and the repositionability of the tape thereto.

Lifting Resistance from Polyurethane Surface

A Printing Plate and a tape sample were both cut to provide strips measuring 6 inches by 1 inches (152 millimeters by 25 millimeters) and the center point of each long edge precisely marked for alignment purposes when mounted. The exposed polyester surface of the printing plate was cleaned using a mixture of isopropanol and water (1:1/w:w) using a lint and scent-free tissue and allowed to dry. PRIMER 94 was applied across the width of the Printing Plate at each end and allowed to dry for 15 to 30 minutes.

The protective release liner, if present, was removed from the first (inner) side adhesive, and the exposed pressure sensitive adhesive was applied by hand to lightly adhere the tape piece lengthwise around the circumference of Polyurethane Sleeve #2 such that the alignment marks at the center of the tape lined up with the score line running parallel to the cylinder axis of the sleeve. The outer sleeve surface had been previously cleaned in the same manner as used for the Printing Plate. The tape was then rolled down circumferentially beginning near the center of the tape length moving once in each direction to beyond each plate short edge and then back to the center position using a rubber roller having a diameter of 37 millimeters, a width of 46 millimeters, and a Shore A hardness of 61, and firm hand pressure.

The liner was then removed from the second (outer) adhesive surface of the tape and using the markings described above, the center of the printing plate piece was precisely aligned with the center of the tape sample mounted on the sleeve with initial contact being made at the markings and then moving outward with gentle contact towards the end of each Printing Plate.

The PSA tape and Printing Plate edge alignment was then inspected to ensure there was no more than 1 millimeter maximum mis-alignment between the tape and plate, then the plate was rolled down circumferentially beginning near the center of the plate length and moving once in each direction to beyond the end of each plate and then back to the center position using a rubber roller having a diameter of 37 millimeters, a width of 46 millimeters, and a Shore A hardness of 61, using moderate hand pressure. Finally, the plate was rolled down back and forth across the width of the plate with the same roller using firm hand pressure beginning near the plate center and slowly progressing toward each end making between 15 and 20 back and forth passes along the entire plate length.

The article having a polyurethane sleeve with the Printing Plate mounted thereto with the PSA tape was aged for 48 hours (+/−1 hour) at 90° C. and 65% RH. After removal from the aging chamber the article was evaluated for lifting resistance as follows. The corners at each end were inspected for the amount of separation between the PSA tape and the polyurethane sleeve. Where separation was observed the separation distance was measured along tape length starting from the end edge. The values at each corner were summed and the average value recorded. The results of between one and five sleeve/PSA tape/Printing Plate articles were evaluated for each tape construction and the average reported in millimeters. None of the aged articles exhibited adhesion failure between the Printing Plate and PSA tape, nor cohesive failure within the PSA tape layers.

Adhesive Layer Thickness

The thickness of Adhesive Transfer Tape Adhesive 1 adhesive layer was measured as follows. The adhesive side of the adhesive transfer tape was laminated to a primed polyester film of pre-measured at 0.025 mm thickness. The release liner was removed from the adhesive transfer tape film laminate and the total thickness of the laminate was measured with a contact pressure thickness gauge (Ono Sokki Model #EG-225 gauge mounted on a Dorsey Model #S-2 stand with 12.7 millimeter diameter foot) a contact pressure of 13 newtons per square meter. The results of five test measurements were averaged, the primed PET film thickness was then subtracted from the average and the result reported in micrometers.

Adhesive Surface Channel Depth

The average depth of air release channels on the PSA 1 surface of a Double Sided PSA/EVA Foam Multilayer Tape was measured via white light interferometry. The instrument was a Bruker Model Contour GT operating in VSI mode with 10× by 0.55× magnification. For each sample five air release channel segments were randomly selected and scanned to determine the surface elevations of the channel and adhesive lands adjacent to the sides of the channel. Two randomly selected cross-sectional chords were then selected across each channel segment and perpendicular to the channel length. The chord depth profile was then used to determine the maximum channel depth relative which was subtracted from the average adhesive surface elevation adjacent to the channel to calculate an adhesive surface channel depth. The average of the ten measurements was reported for each sample and reported in micrometers.

Example 1

Preparation of Pressure Sensitive Adhesive Transfer Tape 1

A first adhesive precursor syrup was prepared by first warming a container of NVC to about 40° C. (104° F.) to liquifiy it, then adding to a glass jar the following: 55.9 parts by weight (pbw) 2EHA, 1.1 pbw liquified NVC, 43 pbw IBOA, and 0.04 pbw Photoinitiator, 0.007 pbw IOTG and mixing to dissolve the Photoinitiator. The mixture was then partially polymerized under a nitrogen atmosphere by exposure to an ultraviolet radiation source having a spectral output from 300-400 nanometers with a maximum at 351 nanometers to provide a syrup having a viscosity of about 3 Pascals-seconds (3000 centipoise) and a monomer conversion of about 10%. Air was then introduced into the syrup to stop further reaction. Next, 0.08 pbw of Triazine, and an additional 0.12 pbw of Photoinitiator were added to the syrup and fully dissolved to give the final coatable adhesive precursor syrup. This syrup was then knife coated onto the embossed surface of an Embossed Release Liner and exposed to ultraviolet radiation by means of a series of lamps having a spectral output from 300-400 nanometers with at maximum at 351 nanometers in a nitrogen-rich atmosphere for a period of 105 seconds to provide a total energy of 510 milliJoules/square centimeter as measured using a calibrated NIST radiometer. Adhesive Transfer Tape 1 having a pressure sensitive adhesive (PSA 1) layer, approximately 0.002 inches (51 micrometers) thick, on the embossed surface of the release liner, with a total thickness of approximately 0.006 inches (0.155 millimeters) was thereby obtained.

Preparation of Pressure Sensitive Adhesive/EVA Foam Tape Laminate 1

A Primer solution was prepared by mixing 70.0 pbw Thermoplastic Adhesion Promoter, 22.0 pbw Silica, and 8 pbw Deionized Water. A #18 wire round Mayer rod was used to apply a thin layer of the Primer solution to the exposed PSA 1 surface of Adhesive Transfer Tape 1 so that after drying the coating for 5 minutes at 71° C. the dried Primer layer thickness was approximately 6 to 8 micrometers). The exposed surface of the Primer layer was then placed against an EVA Foam 1 sheet and both were passed together through a heated nip so that the interface between the Primer layer and foam sheet was maintained at a temperature between 126° C. and 131° C. for approximately two seconds. The hot nip apparatus was provided with a non-stick release surface on the roll which contacted the foam sheet face. A laminate article having a PSA 1 layer bonded to one side of an EVA Foam sheet and a protective release liner over the exposed PSA 1 surface was thereby provided. This laminate article, with liner, had a total thickness of approximately 0.023 inches (584 micrometers).

Preparation of Pressure Sensitive Adhesive Transfer Tape 2

A second adhesive precursor syrup was prepared as described for "Preparation of Pressure Sensitive Adhesive Transfer Tape 1" with the following modifications. The following materials were combined in a glass jar and partially polymerizing to provide an initial syrup having a monomer conversion of about 8%: 64.5 pbw IOA, 8.5 pbw AA, and 27 pbw IBOA, 0.04 pbw Photoinitiator, and Next, 0.15 pbw of Triazine, 0.175 pbw of HDDA and an additional 0.12 parts of Photoinitiator were added to the syrup and fully dissolved to give the final coatable adhesive precursor syrup. This syrup was then knife coated onto the embossed side of a release liner irradiated to provide a second adhesive transfer tape having a PSA 2 layer, approximately 0.002 inches (51 micrometers) thick, on the embossed surface of the release liner with a total thickness of approximately 0.0061 inches (0.15 millimeters) was thereby obtained.

Preparation of Pressure Sensitive Adhesive/Plastic
Film Tape Laminate 2

A Plastic Film Reinforcement was provided and the exposed polyester film surface corona treated under nitrogen atmosphere. Next, a water-based adhesion promoter coating of aliphatic polyurethane and a multifunctional aziridine was applied to the corona treated surface, then dried and cross-linked with heat. Using a pair of nip rollers at room temperature the adhesion promoter coated film surface was bonded to the exposed PSA 2 surface of Adhesive Transfer Tape 2

A laminate article having a Plastic Reinforcement Film with an EVA heat seal layer on one side and PSA 2 layer bonded to the other side and having a protective release liner over the exposed PSA 2 surface was thereby provided. This laminate article, with liner, had a total thickness of approximately 0.0077 inches (196 micrometers).

Preparation of Double Sided PSA/EVA Foam
Multilayer Tape

The exposed foam side of the Pressure Sensitive Adhesive/EVA Foam Tape Laminate 1, prepared as described above, was placed against the exposed EVA heat seal surface of the Pressure Sensitive Adhesive/Plastic Film Tape Laminate 2, prepared as described above, and the resulting construction was passed through a heated rolling nip so that the interface between the foam and EVA heat seal surface of Laminate 2 maintained a temperature between 126° C. and 131° C. for greater than two 2 seconds. Upon removal of the two embossed liners a multilayer tape article having in order, from top to bottom, Pressure Sensitive Adhesive layer 2 (PSA 2) (outer adhesive layer)/Adhesion Promoter (polyurethane and aziridine)/Plastic Reinforcement Film (with EVA heat seal layer facing toward foam layer)/EVA Foam Layer/Primer Layer (Thermoplastic Adhesion Promoter and Silica)/Pressure Sensitive Adhesive layer 1 (PSA 1) (inner adhesive layer) was obtained. This multilayer tape article had a thickness of approximately 0.022 inches (559 micrometers). The pressure sensitive adhesive layer 1 (PSA 1) was evaluated for peel adhesion strength, quick stick adhesion, and lifting resistance as described in the test methods. The results are shown in Table 2 below.

Examples 2 to 10

A series of multilayer tape articles having various Pressure Sensitive Adhesive 1 compositions were prepared as described for Example 1 using the monomer components and amounts as shown in Table 1. The resulting multilayer tape articles were tested as described in the test methods and the results are shown in Table 2.

Example 11

A multilayer tape article having a Pressure Sensitive Adhesive 1 composition as described for Example 2 was prepared using the monomer components and amounts as shown in Table 1 except that no IOTG additive was used during preparation of the Adhesive precursor syrup. The resulting multilayer tape articles were tested as described in the test methods and the results are shown in Table 2.

Adhesive precursor syrups are advantageously prepared with low levels of free radical chain transfer agent additives whose activity is short lived, including for example, isooctyl thioglycolate, by adding such to the monomer blend just prior to syrup preparation. One desirable effect of chain transfer agent addition is to lower the molecular weight of the polymer in the monomer syrup, in order to retain more Newtonian rheology for ease of coating, for example. Adhesive tapes made from adhesive precursor syrups produced with low levels of chain transfer agent addition, typically 0.02 parts or less by weight for each 100 parts by weight monomer blend, perform very similarly to adhesive tapes made with no such additive (Example 11).

Examples 12 to 14

A series of multilayer tape articles having various Pressure Sensitive Adhesive 1 compositions were prepared using the monomer components and amounts as shown in Table 1. The preparation followed that of Example 1 with the following exceptions. The amount of IOTG additive used to prepare Pressure Sensitive Adhesive Transfer Tape 1 was 0.009 pbw. The Release Liner 2 was used to prepare Pressure Sensitive Adhesive Transfer Tape 1. The distance between the coating knife and release liner surface was varied to attain the measured and reported adhesive coating thicknesses of Pressure Sensitive Adhesive Transfer Tape 1 according to Table 4. EVA Foam 2 was used to prepare each Pressure Sensitive Adhesive/EVA Foam Tape Laminate 1. The pressure sensitive adhesive layer 1 (PSA 1) side of Pressure Sensitive Adhesive/EVA Foam Tape Laminate 1 was evaluated for Peel Adhesion Strength from Metallic Surface using Stainless steel panels and included inspection and reporting of adhesion mode type. White light interferometry was used to determine and report the average channel depth of PSA 1. The channel depth and adhesive layer thickness were used to calculate and report the percent channel to layer thickness. The results are shown in Table 4 below.

Comparative Examples 1-8 (CE 1-CE 8)

A series of multilayer tape articles having various Pressure Sensitive Adhesive 1 compositions were prepared as described for Example 1 using the monomer components and amounts as shown in Table 1. The resulting multilayer tape articles were tested as described in the test methods and the results are shown in Table 2.

Peel Adhesion Strength values are desirably 5.50 Newtons/centimeter or less. It is further desirable that such results be obtained independent of the substrate employed. It is also desirable that such results be obtained at both test conditions employed.

Quick Stick values on either on the two substrates tested are desirably 0.50 Newtons/centimeter or above.

Lift resistance values are desirably 1.5 centimeters or less.

In addition, it is desirable that for a given tape construction the average of the peel adhesion strength values obtained on the two substrates tested at the two different test conditions be 4.5 Newtons/centimeter or less. That is, if the results in Table 2 for Example 1 are considered then the average peel adhesion strength across both substrates and both test conditions would be [(3.47+4.09+4.61+5.32)/4]=4.37 Newtons/centimeter. It is further desired that the tape not exhibit cohesive failure upon removal (i.e., leave any residue on the substrate).

It is further desirable that for a given tape construction the range of adhesion strength test values be minimized to provide a relatively constant ease of removability on both cylinder and sleeves at extremes of humidity. Thus it is desirable for the range of strength test values to be less than about 2.70 Newtons/centimeter. That is, if the results in Table 2 for Example 1 are considered then the range of adhesion strength across both substrates would be 5.32-3.47=1.85 Newtons/centimeter.

Table 3 shows the averaged peel adhesion strengths, and range of adhesion strength values for the examples and comparative examples evaluated.

TABLE 1

Monomer Compositions for First Pressure Sensitive Adhesive Layer (PSA 1) (Sleeve Side Adhesive)

| Example | Parts of Monomer (pbw) | | | | |
|---|---|---|---|---|---|
| | 2EHA | IBOA | NVC | NNDMA | AA |
| 1 | 56.90 | 42.00 | 1.10 | — | — |
| 2 | 55.90 | 43.00 | 1.10 | — | — |
| 3 | 53.90 | 45.00 | 1.10 | — | — |
| 4 | 51.90 | 47.00 | 1.10 | — | — |
| 5 | 53.00 | 43.00 | 4.00 | — | — |
| 6 | 55.00 | 43.00 | 2.00 | — | — |
| 7 | 56.75 | 43.00 | 0.25 | — | — |
| 8 | 56.87 | 43.00 | 0.13 | — | — |
| 9 | 57.00 | 43.00 | — | — | — |
| 10 | 57.30 | 42.00 | — | 0.75 | — |
| 11 | 55.90 | 43.00 | 1.10 | — | — |
| 12-14 | 51.90 | 47.00 | 1.10 | — | — |
| CE 1 | 68.90 | 30.00 | 1.10 | — | — |
| CE 2 | 63.90 | 35.00 | 1.10 | — | — |
| CE 3 | 58.90 | 40.00 | 1.10 | — | — |
| CE 4 | 48.90 | 50.00 | 1.10 | — | — |
| CE 5 | 55.00 | 43.00 | — | — | 2.00 |
| CE 6 | 55.90 | 43.00 | — | — | 1.10 |
| CE 7 | 56.40 | 43.00 | — | — | 0.60 |
| CE 8 | 56.70 | 43.00 | — | — | 0.30 |

* 0.08 pdw Triazine crosslinking was used in all Example and Comparative Example

TABLE 2

Results for First Pressure Sensitive Adhesive Layer (PSA 1) (Sleeve Side Adhesive)

| Ex. | Peel Adhesion Strength (N/cm) Polyurethane | | Peel Adhesion Strength (N/cm) SS Plate | | Quick Stick Adhesion (N/cm) | | Lift Resistance (mm) Polyurethane |
|---|---|---|---|---|---|---|---|
| | 3 days @ 90° F./65% RH | 1 Day @ 120° F./<25% RH | 3 days @ 90° F./65% RH | 1 Day @ 120° F./<25% RH | Polyurethane Immediate @ 21° C./50% RH | SS Plate | 2 days @ 90° F./65% RH |
| 1 | 3.47 | 4.09 | 4.61 | 5.32 | 1.55 | 1.62 | 0.3 |
| 2 | 3.33 | 3.44 | 4.21 | 5.05 | 1.37 | 0.67 | 0.0 |
| 3 | 2.69 | 3.04 | 4.31 | 4.77 | 1.16 | 0.58 | 0.0 |
| 4 | 2.20 | 2.74 | 3.74 | 4.76 | 0.71 | 0.61 | 0.3 |
| 5 | 3.06 | 3.21 | 4.06 | 4.79 | 1.07 | 1.13 | 0.0 |
| 6 | 2.67 | 3.05 | 4.34 | 4.73 | 1.05 | 1.48 | 0.0 |
| 7 | 3.27 | 3.36 | 4.36 | 4.63 | 1.39 | 1.83 | 0.0 |
| 8 | 3.40 | 3.65 | 4.28 | 5.13 | 1.28 | 2.26 | 1.5 |
| 9 | 3.31 | 3.63 | 4.49 | 4.21 | 1.54 | 1.46 | 0.5 |
| 10 | 3.04 | 4.19 | 3.63 | 5.44 | 1.39 | 1.86 | 1.0 |
| 11 | 3.64 | 3.05 | 4.60 | 4.90 | 1.41 | 1.30 | 0.0 |
| CE 1 | 6.52 | 7.11 | 7.49 | 7.74 | 2.98 | 2.76 | 1.0 |
| CE 2 | 4.78 | 6.18 | 5.87 | 6.08 | 2.63 | 2.52 | 1.5 |
| CE 3 | 3.86 | 4.74 | 4.89 | 5.10 | 1.69 | 1.48 | 2.0 |
| CE 4 | 2.28 | 2.67 | 4.09 | 5.35 | 0.58 | 0.46 | 0.0 |
| CE 5 | 4.35 | 4.05 | 19.81* | 20.43* | 1.44 | 1.70 | 0.0 |
| CE 6 | 4.61 | 4.33 | 19.33* | 19.05* | 1.19 | 2.29 | 0.0 |
| CE 7 | 4.93 | 5.13 | 19.56* | 7.51 | 1.94 | 2.24 | 1.3 |
| CE 8 | 3.71 | 3.77 | 18.17* | 1.97 | 1.74 | 2.52 | 3.3 |

*Cohesive failure

TABLE 3

Average and Ranged Results for First Pressure Sensitive Adhesive Layer (PSA 1) (Sleeve Side Adhesive)

| Ex. | Average Peel Adhesion Strength (N/cm) | Range of Adhesion (N/cm) |
| --- | --- | --- |
| 1 | 4.37 | 1.85 |
| 2 | 4.01 | 1.72 |
| 3 | 3.70 | 2.08 |
| 4 | 3.36 | 2.57 |
| 5 | 3.78 | 1.73 |
| 6 | 3.70 | 2.06 |
| 7 | 3.90 | 1.36 |
| 8 | 4.11 | 1.73 |
| 9 | 3.91 | 1.17 |
| 10 | 4.07 | 2.40 |
| 11 | 4.05 | 1.85 |
| CE 1 | 7.22 | 1.22 |
| CE 2 | 5.73 | 1.41 |
| CE 3 | 4.65 | 1.25 |
| CE 4 | 3.60 | 3.08 |
| CE 5 | * | * |
| CE 6 | * | * |
| CE 7 | * | * |
| CE 8 | * | * |

* Cohesive failure

TABLE 4

Results for First Pressure Sensitive Adhesive Layer (PSA 1) (Sleeve Side Adhesive)

| Ex. | Adhesive Layer Thickness (micrometers) | Adhesive Channel Depth (micrometers) | Channel Depth to Thickness (%) | Peel Adhesion Strength (N/cm) SS Plate 1 Day @ 120° F./<25% RH | Peel Adhesion Failure Mode |
| --- | --- | --- | --- | --- | --- |
| 12 | 68.4 | 10.5 | 15.3 | 3.8 | C0 |
| 13 | 75.0 | 12.2 | 16.3 | 4.2 | C0 |
| 14 | 83.3 | 11.7 | 14.0 | 4.2 | C0 |

Adhesive Layers with Channel Depth to Thickness ratios of greater than 18% demonstrated a Peel Adhesion Failure Mode of C2, C3, or worse.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A pressure sensitive adhesive comprising an adhesive copolymer which is a copolymer of a set of monomers comprising:
   a) 41.0-49.0 weight percent of isobornyl acrylate;
   b) 0.0-4.5 weight percent of one or more basic-functional polar monomers comprising a polymerizable double bond; and
   c) 46.5-58.9 weight percent of one or more alkyl (meth) acrylate monomers, with alkyl groups selected from linear and branched alkyl groups comprising 2-12 carbon atoms and branched alkyl groups comprising 13-20 carbon atoms;
   wherein weight percentages are based on a weight of all monofunctional monomers comprising the adhesive copolymer.

2. The pressure sensitive adhesive of claim 1 wherein said alkyl groups are selected from linear and branched alkyl groups comprising at least 4 carbon atoms and not more than 10 carbon atoms.

3. The pressure sensitive adhesive of claim 1 wherein said one or more basic-functional polar monomers comprising a polymerizable double bond are selected from nitrogen-containing species.

4. The pressure sensitive adhesive of claim 1 wherein said one or more basic-functional polar monomers comprising a polymerizable double bond are selected from species which include an amide group.

5. The pressure sensitive adhesive of claim 1 wherein said one or more basic-functional polar monomers comprising a polymerizable double bond are selected from species which include a cyclic amide moiety.

6. The pressure sensitive adhesive of claim 1 wherein the set of monomers comprises not less than 41.8 weight percent of isobornyl acrylate.

7. The pressure sensitive adhesive of claim 1 wherein the set of monomers comprises not less than 42.3 weight percent of isobornyl acrylate.

8. The pressure sensitive adhesive of claim 1 wherein the set of monomers comprises at least 0.1 weight percent of said one or more basic-functional polar monomers comprising a polymerizable double bond.

9. The pressure sensitive adhesive of claim 1 wherein the set of monomers comprises not more than 1.6 weight percent of said one or more basic-functional polar monomers comprising a polymerizable double bond.

10. The pressure sensitive adhesive of claim 1 wherein the set of monomers comprises no acid-functional monomers.

11. The pressure sensitive adhesive of claim 1 wherein the adhesive copolymer is crosslinked.

12. A tape comprising a first pressure sensitive adhesive layer borne on a first substrate, wherein the first pressure sensitive adhesive layer comprises the pressure sensitive adhesive of claim 1, and wherein the first pressure sensitive adhesive layer is an outermost layer of the tape.

13. The tape according to claim 12 wherein the first substrate is a polymeric foam.

14. The tape according to claim 12 wherein the first pressure sensitive adhesive layer is directly bound to a first primer layer which is directly bound to the first substrate, wherein the first substrate is an ethylene/vinyl acetate copolymer foam, and wherein the first primer layer comprises an ethylene/vinyl acetate copolymer and nanoparticles.

15. The tape according to claim 12 additionally comprising a second pressure sensitive adhesive layer borne on a second substrate, wherein the first substrate is bound to the second substrate, and wherein the second pressure sensitive adhesive layer is an outermost layer of the tape.

16. The tape according to claim 12 wherein the pressure sensitive adhesive layer comprises air release channels having a depth, wherein the depth of the air release channels is not more than 18% of the thickness of the pressure sensitive adhesive layer, and wherein the depth of the air release channels is at least 4 microns.

17. The pressure sensitive adhesive of claim 1 wherein the set of monomers comprises not more than 48.0 weight percent of isobornyl acrylate.

18. The pressure sensitive adhesive of claim 1 wherein the set of monomers comprises not less than 52.0 weight percent of said one or more alkyl (meth)acrylate monomers.

19. The pressure sensitive adhesive of claim 1 wherein the set of monomers comprises no more than 0.20 weight percent of acid-functional monomers.

20. A pressure sensitive adhesive layer having a thickness, the pressure sensitive adhesive layer comprising air release channels in an adhesive surface, the air release channels having a depth, wherein the depth of the air release channels is not more than 18% of the thickness of the pressure sensitive adhesive layer, and wherein the depth of the air release channels is at least 4 microns.

* * * * *